July 7, 1964 P. SMITH ETAL 3,140,390
THERAPEUTIC APPLIANCE
Filed June 12, 1963
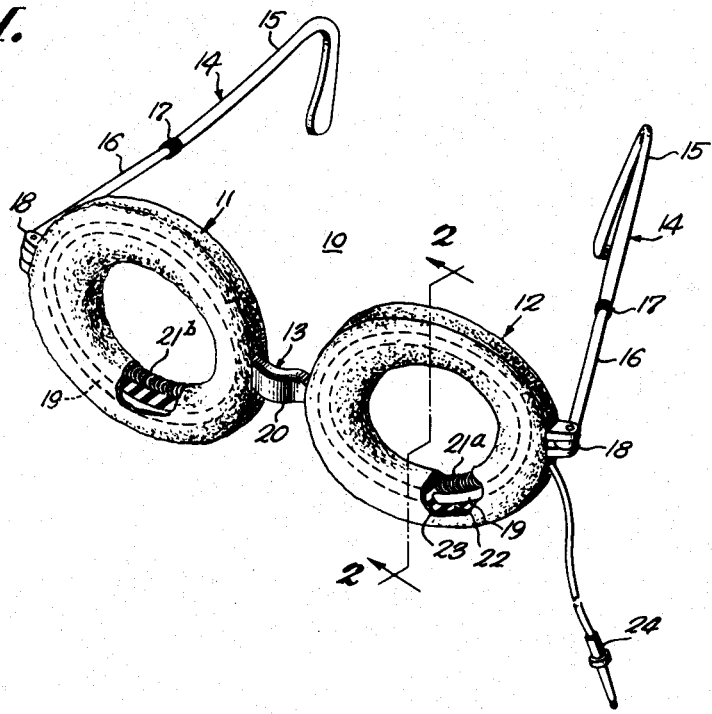
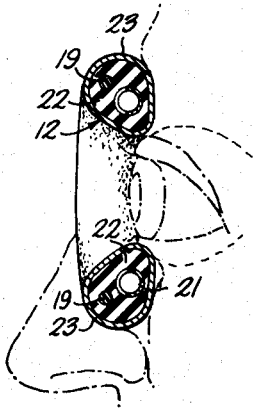
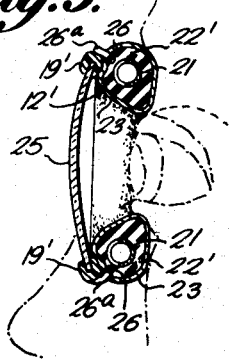
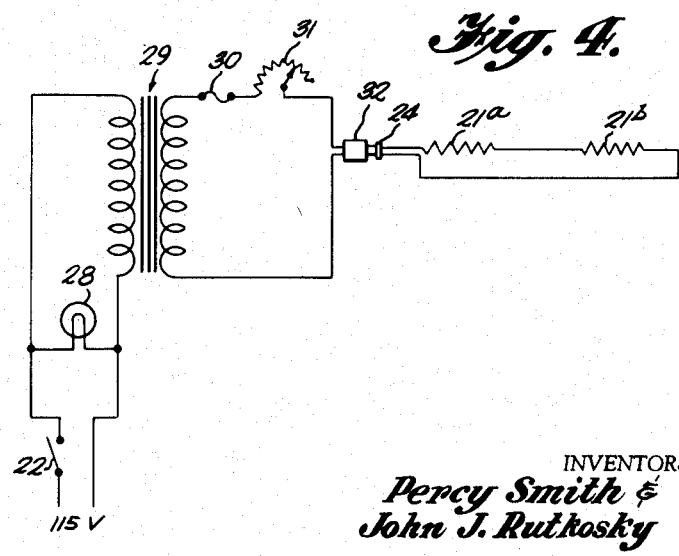
INVENTORS
Percy Smith &
John J. Rutkosky
BY Mason, Fenwick & Lawrence
ATTORNEYS – # 3,140,390
THERAPEUTIC APPLIANCE
Percy Smith, 134 26th St., Newport News, Va., and John J. Rutkosky, 9619 Lake Shore Blvd., Cleveland, Ohio
Filed June 12, 1963, Ser. No. 287,234
3 Claims. (Cl. 219—527)

The present invention relates to therapeutic devices, and has particular relation to electrically heated devices capable of being positioned about and upon the eyes of the user in a close heat transfer relationship to relieve pain, discomfort or irritation caused by eye fatigue and to cure possible eye disease responsive to heat therapy.

It has long been known that heat applied to various areas of the body stimulates the body functions and increases most chemical action and, therefore, has a most beneficial effect upon the area to which the heat is applied. Electrically heated facial masks and hoods are well known in the art to treat the sinuses of a patient or to transfer heat to the general areas of the neck and forward portion of the skull. These devices normally cover the entire head or are positioned to apply heat only to the frontal sinus areas of the head, and therefore, the prior art devices are not suitable for applying heat directly to the eyes or eyelids to relieve fatigue and irritation therein, and to cure possible eye disease responsive to heat therapy.

It is, therefore, an object of this invention to provide an electrically heated device so designed to fit upon the eyes of the user in good heat transfer relationship therewith.

Another object of this invention is the provision of an electrically heated device that utilizes an ophthalmic spectacle-like frame member adaptable to fit many different patients, having mounted upon it suitable insulated resistance heating coils that fit in close proximity to the eyes of the wearer to transmit heat thereto, wherein the current supplied to the heating coils is manually controllable to provide a range of heat.

Other objects, advantages and capabilities of the invention will become apparent from the following description, taken in conjunction with the accompanying drawings showing only a preferred embodiment of the invention. It is understood, however, that the description is not to be taken in a limiting sense, the scope of the invention being defined in the appended claims.

In the drawings:

FIGURE 1 is a perspective view of one embodiment of the therapeutic appliance of the present invention with a portion of each heating pad cut away to show the interior construction;

FIGURE 2 is a sectional view taken on line 2—2 of FIGURE 1;

FIGURE 3 is a sectional view similar to that of FIGURE 2 showing a second embodiment of the invention;

FIGURE 4 is a schematic electrical diagram showing the arrangement of the heating elements and their controls.

Referring to the drawings wherein like reference characters designate corresponding parts throughout the several figures, the therapeutic appliance is represented in FIGURE 1 by the reference character 10 and comprises two annular heating pads 11 and 12 mounted upon any suitable ophthalmic spectacle-like frame member generally shown by the reference numeral 13.

The frame member 13, in order that it might fit most users of the present device, has adjustable temple pieces 14 that comprise a rearmost ear member 15 adapted to fit about the ear of the user in the same manner as one would wear conventional eye glasses. The ear member 15 in its forward portion is hollow so that the slidable member 16 may be received in telescoping relation within ear member 15 to permit adjustability in length of the temple pieces 14. Once the temple pieces are adjusted to a desired length, they are secured in this position by turning a conventional jamb nut 17 which is threaded upon the slotted, forwardmost end of ear member 15, thereby wedging the end of ear member 15 down upon the slidable member 16.

Temple pieces 14 are hingedly connected at 18 to the pair of laterally spaced eye-encircling rings 19 which generally conform to the shape of the heating pads affixed thereto. The pair of rings 19 are connected together by a nose piece or bridge 20 which is adapted to fit about the nose of the individual wearing the present invention.

The heating pads 11 and 12 are identical in construction and as shown in the cutaway portion of heating pad 12 the heating element in a preferred embodiment, comprises a coiled resistance element 21a disposed in close proximity to the ring 19 with both the resistance element 21a and the ring 19 being encased within a suitable insulation 22, such as rubber, to protect the face of the user. The exterior layer 23 of the heating pads is preferably a soft flannel-like fabric that extends entirely about the insulation 22 and may, if desired, be removable to permit cleaning. The fabric 23 should preferably be a low cost material that would permit it to be discarded whenever the invention is used by others to prevent the transmittal of germs. It is contemplated that heating pads 11, 12 may not have openings therein as shown in FIGURES 1 and 2.

To supply current to the series connected heating pads 11 and 12, an electric lead of suitable length extends from the resistance coil 21a in heating pad 12 and terminates in a jack plug 24.

A further modification of the present invention is illustrated in FIGURE 3 wherein the patient that needs to wear corrective eye glasses may have corrective lenses incorporated within this embodiment so that proper eyesight is had whenever the therapeutic appliance is worn. In this embodiment the lenses 25 are set within rim mount or ring 19' which supports heating pad 12' by means of a suitable stiff wire 26. The wire 26 is preferably embedded within the insulating material 22' and has outwardly projecting portions 26a suitably connected to the ring 19' by any well known adhesive in order that the heating pads will be supported upon the ring 19' and thence to the temple pieces 14 in the correct manner. In all other respects the embodiment of FIGURE 3 is similar to that shown in FIGURES 1 and 2.

The schematic electrical diagram of FIGURE 4 shows a preferred control circuit for the present invention adapted to be connected to a suitable 115 volt A.C. supply. In the circuit is an on-off switch 27 and a pilot light 28 which indicates if current is being supplied to the transformer 29 which, in a preferred embodiment, steps down the 115 volt A.C. line voltage to 12 volts A.C. The fuse 30 protects the low voltage side of the circuit from possible overload and the variable rheostat 31 provides the user with a range of heat control in the heating pads 11, 12 from low heat to a desired high heat. It is contemplated that in the preferred embodiment a 20 ohm, 5 watt variable rheostat 31 will be used. A jack socket 32 receives the jack plug 24 in which the series connected resistance elements 21a and 21b terminate.

In operation of the present invention the user merely has to adjust the temple pieces 14 for a proper fit and tighten the jamb nut 17 to maintain this fit and then place the device about the eyes in a manner similar to putting on eye glasses. Upon the placement of jack plug 24 into jack socket 32 and the closing of switch 27, the patient then adjusts the rheostat 31 for the desired heat setting.

Various modifications may be made in the invention without departing from the spirit thereof, and it is desired therefore, that only such limitations shall be placed there-

What is claimed is:

1. In a therapeutic appliance for applying heat to the eyes, an ophthalmic spectacle-like frame comprising a unitary front frame part including a pair of laterally spaced eye-encircling rings adapted to be disposed before the eyes of the wearer and connected by a nose bridge, temple members hingedly connected to said front frame part and terminating in a portion having a curvature to fit about the ears of the wearer, said temple members being adjustable in length, a pair of annular bodies of insulating material having generally an oval shaped cross section, an electric heater embedded in each of said annular bodies comprising a coiled resistance wire disposed in a path conforming to the associated annular body, and a fabric covering disposed about each of said annular bodies, said annular bodies and fabric covering being mounted upon said rings to rest against the eyes of the wearer with the center opening of the annular bodies providing a sight opening, said annular bodies containing means for mounting said annular bodies and fabric covering upon said rings comprising a stiff wire member embedded within said insulation material and having a plurality of outwardly projecting portions extending through said insulation material and fabric covering, said portions being affixed to said rings, and means for supplying said heater with electric current.

2. A therapeutic appliance for applying heat directly to the eyes, comprising a unitary front frame part including a pair of laterally spaced eye-encircling rings adapted to be disposed before the eyes of the wearer and connected by a nose bridge, temple members hingedly connected to said front frame part and adapted to be placed about the head of the wearer, the temple members being adjustable in length, a pair of heating elements each comprising a coiled resistance wire extending in a path conforming substantially to the shape of said rings, electrical insulating material intimately covering the rings and the heating elements and insulating said heating elements from said rings, said insulation covering having a cross sectional shape in the form of an inwardly extending oval with respect to the eyes of the wearer, means for supplying said heating elements with electric current whereby when the inwardly extending oval of insulation is positioned in operative relation adjacent the eyes of the wearer and energizing current is supplied to the heating elements heat is thereby transmitted directly to the eyes and the region thereabout.

3. A therapeutic appliance for applying heat directly to the eyes, comprising a unitary front frame part including a pair of laterally spaced eye-encircling rings adapted to be disposed before the eyes of the wearer and connected by a nose bridge, temple members hingedly connected to said front frame part and adapted to be placed about the head of the wearer, the temple members being adjustable in length, a pair of heating elements each comprising a coiled resistance wire extending in a path conforming substantially to the shape of said rings, electrical insulating material intimately covering the rings and the heating elements and insulating said heating elements from said rings, said insulation covering having a cross sectional shape in the form of an inwardly extending oval with respect to the eyes of the wearer, a fabric covering disposed about each of said insulation covered heating elements, means for supplying said heating elements with electric current whereby when the inwardly extending oval of insulation is positioned in operative relation adjacent the eyes of the wearer and energizing current is supplied to the heating elements heat is thereby transmitted directly to the eyes and the region thereabout.

References Cited in the file of this patent

UNITED STATES PATENTS

| | | |
|---|---|---|
| 574,124 | Wainwright | Dec. 29, 1896 |
| 669,949 | Underwood | Mar. 12, 1901 |
| 1,963,990 | Gilkeson et al. | June 26, 1934 |
| 2,207,705 | Cox | July 16, 1940 |
| 2,392,539 | Leible | Jan. 8, 1946 |
| 2,825,266 | Kleinman | Mar. 4, 1958 |

FOREIGN PATENTS

| | | |
|---|---|---|
| 380,263 | Germany | Sept. 6, 1923 |